United States Patent

Taguchi et al.

[11] Patent Number: 5,203,756
[45] Date of Patent: Apr. 20, 1993

[54] LAMINATOR

[75] Inventors: Hiroshi Taguchi, Tokyo; Yoji Washizaki, Saitama; Akira Igarashi, Tokyo; Hiroyoshi Nakano, Saitama, all of Japan

[73] Assignee: Somar Corporation, Tokyo, Japan

[21] Appl. No.: 839,675

[22] Filed: Feb. 21, 1992

Related U.S. Application Data

[63] Continuation of Ser. No. 650,374, Jan. 30, 1991, abandoned.

[30] Foreign Application Priority Data

May 15, 1990 [JP] Japan ................... 2-125959

[51] Int. Cl.⁵ .................................. B21B 13/02
[52] U.S. Cl. ...................... 492/16; 492/46; 492/56
[58] Field of Search ............ 29/113.1, 113.2, 116.1, 29/116.2, 132; 165/89

[56] References Cited

U.S. PATENT DOCUMENTS

| | | | |
|---|---|---|---|
| 3,203,073 | 8/1965 | Stein | 29/113.1 |
| 3,460,221 | 8/1969 | Korsch | 29/113.1 |
| 4,261,788 | 4/1981 | McClung | 29/116.1 X |
| 4,266,328 | 5/1981 | Harada et al. | 29/116.1 |
| 4,327,467 | 5/1982 | Quaint | 29/113.1 |
| 4,631,794 | 12/1986 | Riihinen | 29/132 |
| 4,737,810 | 4/1988 | Kobayashi et al. | 118/119 X |
| 4,785,514 | 11/1988 | Kannwischer | 29/116.1 |
| 4,809,599 | 3/1989 | Kawada et al. | 29/121.8 X |
| 4,856,158 | 8/1989 | Lindroos et al. | 29/116.1 |

FOREIGN PATENT DOCUMENTS

| | | |
|---|---|---|
| 3334009 | 11/1985 | Fed. Rep. of Germany . |
| 62-49169 | 10/1987 | Japan . |
| 63-117487 | 5/1988 | Japan . |

Primary Examiner—Timothy V. Eley
Assistant Examiner—C. Richard Martin
Attorney, Agent, or Firm—Sughrue, Mion, Zinn, Macpeak & Seas

[57] ABSTRACT

A pressurizing roller for use in a laminator to bond a film to a panel has a hollow outer shell and flanges on both ends. A roller shaft extending through the flanges and the outer shell transfers its angular moment of force via bearings directly to the flanges and via the flanges to the outer shell to provide uniform distribution of pressure by the roller outer shell to the film and panel. The outer shell is heated to a uniform temperature throughout.

7 Claims, 4 Drawing Sheets

LAMINATOR

This is a continuation of application No. 07/650,374 filed Jan. 30, 1991, now abandoned.

BACKGROUND OF THE INVENTION

1. Field of the Industrial Application

The invention described herein relates to a laminator for bonding a film onto a panel, and more particularly to a pressurizing roller used to bond a film onto a panel.

2. Description of the Prior Art

A process of manufacturing a printed circuit board used for electronic equipment, such as a computer, includes a step of bonding a laminated material onto a panel for the printed circuit board. The laminated material is made up of a photo-sensitive resin layer (resist layer) and a transparent resin film. The photo-sensitive resin layer is bonded directly onto the surface of the panel, and the transparent resin film is formed on the photo-sensitive resin layer.

The laminated material is bonded onto the panel with a laminator which has been disclosed, for instance, by Japanese Patent Application (OPI) No. 117487/1988 (the term "OPI" as used herein means an "unexamined published application") filed by the present applicant. That is, the laminated material is bonded onto the panel with the laminator as follows:

First, a panel conveying mechanism is operated to convey the panel until the front end portion, in the direction of conveyance, of the panel reaches a film bonding position. The laminated material in the form of a belt is supplied from a film supply roller. The transparent resin film on the front end portion, in the direction of conveyance, of the belt-shaped laminated material is vacuum held with a main vacuum plate (film supplying member). The main vacuum plate has a temporary film bonding member at its end which is on the side of the film bonding position. The temporary film bonding member draws the front end portion of the laminated material thereto. The temporary film bonding member has vacuum holes communicated with a vacuum system to draw the laminated material thereto, and incorporates a heater for temporarily bonding the front end portion of the laminated material.

The main vacuum plate and the temporary film bonding member are allowed to approach the film bonding position (the surface of the front end portion of the panel). Under this condition, the front end portion of the laminated material abuts against the surface of the front end portion of the panel, and the former is temporarily bonded to the latter as the temporary film bonding member generates heat.

Thereafter, the drawing operations of the main vacuum plate and the temporary film bonding member are suspended, and the main vacuum plate and the temporary film bonding member are moved away from the film bonding position. In this operation, the front end portion of the laminated material is held at the film bonding position, because it has been temporarily bonded onto the surface of the panel.

Under this condition, a hot pressurizing roller which is being rotated is caused to approach the film bonding position to push the bonded portion of the laminated material. As the hot pressurizing roller is being rotated, the laminated material is continuously bonded to the surface of the panel, while the panel is conveyed. Since, as was described above, the hot pressurizing roller is rotated while the panel is conveyed, the laminated material is automatically supplied to the film bonding position.

While the laminated material is being bonded to the surface of the panel, the rear end of the panel is detected to provide a detection signal. In response to the detection signal, the laminated material being supplied is cut to a length corresponding to the length of the panel measured in the direction of conveyance. The laminated material is cut with a cutter as follows: A sub-vacuum plate provided on the path of the laminated material is operated to draw and retain the laminated material at its cutting position (downstream of the laminated material), and under this condition the cutter is moved across the elongated laminated material to cut the latter. The cutter is a disk-shaped cutter. The rear end portion of the laminated material thus cut is drawn and retained with a vacuum bar (film rear end vacuuming and retaining member), and is then guided, under predetermined tension, to the rear end portion of the panel. The rear end portion of the laminated material is thermally bonded to the surface of the rear end portion of the panel with the hot pressurizing roller.

The panel, to which the laminated material has been bonded as described above, is conveyed to the following station where an exposure unit is provided.

A film bonding technique of this type, in which a part of the laminated material is temporarily bonded to the panel, and then the laminated material is thermally bonded to the panel, has been disclosed, for instance, by West Germany Patent DE 3334009 C2 and Japanese Patent Application Publication No. 49169/1987.

The pressurizing roller used to bond the film on the panel is as shown in FIG. 5. The outer cylindrical wall of a cylinder 101 of aluminum is covered with a rubber layer 102 about 4 mm in thickness. The cylinder 101 has a central through-hole into which a sheathed heater 103 is inserted to heat the pressurizing roller 100.

Pipe-shaped iron roller shafts 104A and 104B are fitted into holes, respectively, which are formed in both end faces of the pressurizing roller 100 in such a manner that they are in alignment with the central through-hole mentioned above. The roller shafts serve as the rotary shafts of the pressurizing roller 100. A slip ring is mounted on the shaft 104 so as to supply current to the sheathed heater 103 through electrical wires 105. The sheathed heater 103 is provided with a temperature detector which is brought into contact with the surface of the pressurizing roller, and a temperature controller which, in response to the output signal of the temperature detector, controls the voltage applied to the sheathed heater 103. Thus, with the aid of these elements, the temperature of the surface of the pressurizing roller is maintained at about 100°.

Films are bonded to a panel 106 as shown in FIG. 6 (an explanatory diagram of a film path as viewed from the side of a laminator). Upper and lower film rollers 107A and 107B supply films, each of which is of a three-layer structure. The non-peeled surface of each film with one layer peeled is brought into contact with the respective pressurizing roller through a winding angle of about 60°. Accordingly, the peeled surfaces of the films, while being confronted with each other, are conveyed in the direction of movement of the panel 106 between upper and lower pressurizing rollers 100A and 100B in such a manner that the panel 106 is located between the peeled surfaces of the films. Under this condition, the upper and lower pressurizing rollers 100A and 100B are pushed in a direction against each other. Thus, as the panel 106 passes through the upper and lower pressurizing rollers 100A and 100B, the films are bonded to the panel.

The surfaces of the upper and lower pressurizing rollers 100A and 100B are spaced about 10 mm from each other. The lower pressurizing roller 100B is not movable, because bearings mounted on its roller shafts 104A and 104B are secured to a stationary member with screws. And a driving gear is secured to the roller shaft 104A with screws.

On the other hand, bearings mounted on the roller shafts 104A and 104B of the upper pressurizing roller 100A are secured to a vertically movable member. Thus, as the vertically movable member is moved vertically by an elastic force or air pressure, the upper pressurizing roller 100A is moved into or out of engagement with the lower pressurizing roller 100B.

Similarly as in the case of the lower pressurizing roller 100B, a driving gear is secured to the roller shaft 104A of the upper pressurizing roller 100A with screws.

The upper and lower pressurizing rollers 100A and 100B abut one another by the force applied to the roller shafts 104A and 104B through the bearings of the upper pressurizing roller.

The bearings mounted on the roller shafts 104A and 104B are spaced about 700 mm from each other. A force of about 100 kgf applied to the roller shafts 104A and 104B is applied to the bearings.

FIG. 7 is a side view showing a laminator provided with pressurizing rollers of a non-heating type, each of which is made of a rigid cylindrical pipe of stainless steel having a surface coated with "Teflon". The pressurizing rollers are so designed that the rigid cylindrical pipes themselves are rotary shafts, and are scarcely bent by any bending moment. Accordingly, the pressurizing rollers 109A and 109B are abutted against each other uniformly over their entire width. However, since the pressurizing rollers are of non-heating type as was described above, it is difficult to sufficiently bond the films to the panel. In order to eliminate this difficulty, film preheating units 110A and 110B of metal, which are each arcuate and called "heat shoes", are provided upstream of the pressurizing rollers 109A and 109B, respectively.

The film preheating units (heat shoes) 110A and 110B are stationary, and incorporate sheathed heaters.

The surface of each film preheating unit, with which the non-peeled surface of the corresponding film is brought into slide contact through a film winding angle of 180° is coated with "Teflon", and its temperature is controlled to about 110° C. by the sheathed heater buried in the film preheating unit.

The films are bonded to the panel 106 in the same manner as in the laminator shown in FIG. 6.

That is, the upper and lower film preheating units (heat shoes) 110A and 110B, on which the non-peeled surfaces of the films are wound, are secured to two side boards with screws in such a manner that they are spaced about 10 mm from each other. The panel is moved into the space between the upper and lower preheating units (heat shoes) 110A and 110B. Thus, while the panel is being moved through the upper and lower pressurizing rollers confronted with each other, the peeled surfaces of the films are bonded to the panel.

Problems to be Solved by the Present Invention

In FIG. 5, the distance between the bearings mounted on the roller shafts 104A and 104B is about 700 mm, and the force of about 100 kgf applied to the roller shafts 104A and 104B is applied to the pressurizing rollers 100A and 100B, as was described above. When the upper and lower pressurizing rollers 100A and 100B are pushed against each other, a bending moment acts on the roller shafts 104A and 104B, so that the middle portion of each of the pressurizing rollers 100A and 100B exerts less pressure than the other portions.

That is, it is difficult for each of the pressurizing rollers 100A and 100B to provide uniform pressure over the entire length thereof.

The pressure width may be increased by increasing the force applied to the movable member. However, as the force is increased, in each of the pressurizing rollers 100A and 100B, the difference between the pressure at the middle portion and the pressure at the right or left end portion is increased. That is, merely increasing the force applied to the movable member is not suitable for making the distribution of pressure uniform.

If the film bonding operation is carried out under the condition that the pressurizing rollers are not uniform in the distribution of pressure, then the films are not uniformly bonded to the panel; that is, the films are not sufficiently bonded to the part of the panel where the pressure is lower. In addition, the non-uniform distribution of pressure; i.e., the difference in pressure may cause the panel to meander, and the meandering of the panel may form wrinkles on the films.

Even if the pressurizing rollers are uniform in the distribution of pressure, it is necessary to use an elastic member of rubber or the like to push the films against the panel. Otherwise the unevenness of the panel may make it difficult to uniformly bond the films to the panel.

SUMMARY OF THE INVENTION

Accordingly, an object of this invention is to eliminate the above-described difficulties accompanying a conventional laminator.

More specifically, a first object of the invention is to provide a technique of bonding films to a panel with pressurizing rollers having uniform distribution of pressure.

A second object of the invention is to provide a technique of bonding films to a panel with the pressurizing surfaces of pressurizing rolls having uniform distribution of temperature.

A third object of the invention is to provide a technique which permits uniform bonding of a film to a panel despite the unevenness of the panel.

The foregoing objects and other objects of the invention have been achieved by the provision of a laminator in which a panel is conveyed to a film bonding section by conveying means such as a conveyor, where films supplied from film supplying units are bonded onto the panel with heated pressurizing rollers, in which, according to the invention, each of the pressurizing rollers is an electromagnetic induction heat generating roller, the cylindrical wall of which is covered with a rubber layer 1.5 to 3 mm in thickness.

In the laminator, in bonding the bonding surfaces of the films to the panel, the non-bonding surfaces of the films which are opposite to the bonding surfaces are preheated with the pressurizing rollers.

Further in the laminator, a heating control system for the pressurizing rollers is a phase control system.

In the above-described means for solving the problems, upper and lower pressurizing roller are each made up of a hollow roller shell with two flanges at both ends, and a roller shaft penetrating the hollow roller shell, and force is applied to both ends of the roller shaft of each of the upper and lower pressurizing rollers so that pressurization is achieved with the distribution of pressure uniform over the entire length of each roller shell.

That is, the bending moment attributed to the force applied to the ends of the roller shaft acts on the roller shaft, but it scarcely acts on the roller shell. Hence, the films are bonded to the panel with the pressurizing rollers having uniform distribution of pressure.

As was described above, the outer cylindrical wall of each of the pressure rollers is covered with the rubber layer 1.5 to 3 mm in thickness, and the films are bonded to the panel while the non-bonding surfaces of the film are being preheated by the pressurizing rollers. Therefore, the films are bonded to the panel with the pressurizing surfaces of the pressurizing rollers having uniform distribution of temperature. This will eliminate the bonding difficulty caused by unevenness of the panel.

Furthermore, the pressurizing rollers are heated according to a phase control heating system. Therefore, the pressurizing surfaces of the pressurizing rollers can be maintained with uniform distribution of temperature.

The foregoing objects and other objects of the invention as well as the specific features of the invention will become more apparent from the following detailed description when read in conjunction with the accompanying drawings.

DETAILED DESCRIPTION OF PREFERRED EMBODIMENTS

Figure 1:
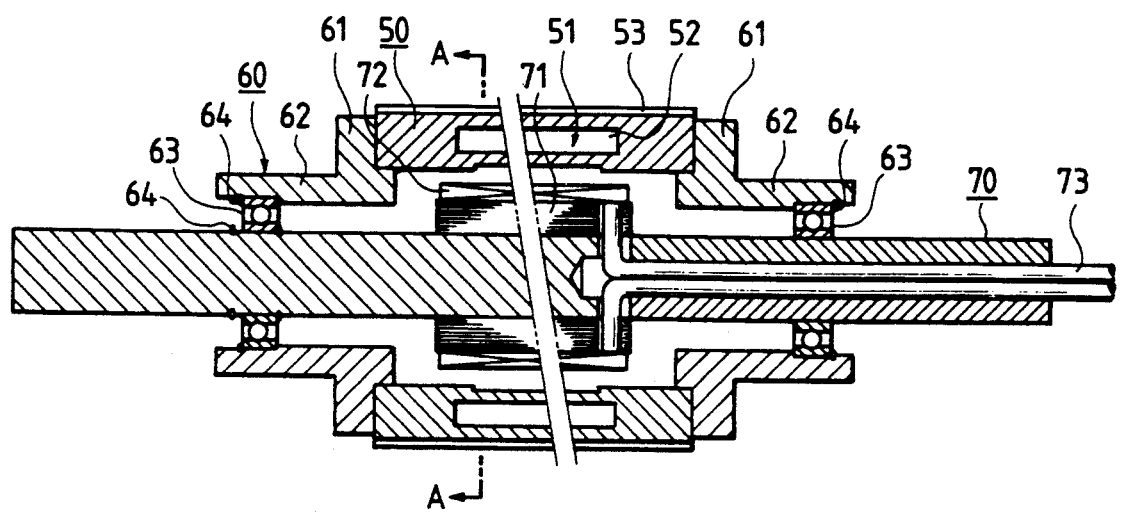
FIG. 1 is a front view, with parts cut away, outlining the arrangement of an electromagnetic induction heat generating roller (a pressurizing roller in a laminator) according to one embodiment of the invention.

A preferred embodiment of this invention will be described with reference to the accompanying drawings.

In the accompanying drawings, like parts are designated by like reference numerals or characters for simplification of description.

Figure 2:
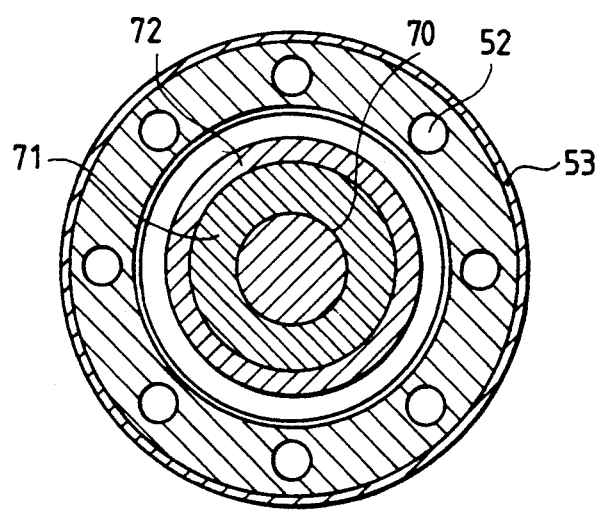
FIG. 2 is a sectional view taken along line A—A in FIG. 1.

FIG. 1 is a front view, with parts cut away, outlining the arrangement of an electromagnetic induction heat generating roller (or a laminator's pressurizing roller) according to one embodiment of the invention. FIG. 2 is a sectional view taken along line A—A in FIG. 1.

Roughly stated, the electromagnetic induction heat generating roller (hereinafter referred to as "a pressurizing roller", when applicable) of the invention, as shown in FIGS. 1 and 2, comprises: a roller shell (or hollow cylindrical roller) 50; flanges 60; and a roller shaft 70.

The roller shell (hollow cylindrical roller) 50 is formed as follows: Predetermined cavities 51 are formed in the wall of the hollow cylindrical pipe. The cavities 51 are filled with a thermal medium and sealed to form jacket chambers 52. The outer cylindrical wall of the pipe is covered with a rubber layer 53 2 mm in thickness, so that the pressurizing roller has an elastic outer cylindrical wall.

The rubber may be synthetic rubber such as silicone rubber or fluoro-rubber. And the rubber is preferably 60 to 70 in JIS A hardness.

The term "JIS A harness" is intended to mean the hardness which is measured with a JIS spring type hardness tester "A" (cf. JIS K6301 1975).

The thermal conductivity of the rubber layer may be increased by mixing metal powder such as aluminum powder with the rubber.

It is essential that the thickness of the rubber layer is a predetermined value. If the thickness is larger or smaller than the predetermined value, the pressure of the pressurizing roller is not proper; that is, a film 1B cannot be uniformly bonded with the pressurizing roller.

The flanges 60 are flanged cylindrical pipes of iron which are secured to both ends of the roller shell 50 with bolts. Each of the flanges 60 comprises: a flange-shaped disk part 61, whose outside diameter is slightly smaller than that of the roller shell 50; and a small diameter cylindrical part 62 merging with the disk part 61. The inner diameter of the flanges 60 is so determined that bearings 63 mounted on the roller shaft 70 are fitted in the flanges 60.

The roller shaft 70 is a stainless steel rod which is inserted into the roller shell 50. An iron core 71 is mounted on the roller shaft 70 in such a manner that it is surrounded by the roller shell 50. A coil 72 is wound on the iron core 71. The coil 72 is connected to electrical wires 73 which are laid in the axial hole formed in the roller shaft 70 and led out of the latter so as to be connected to an external electrical source.

The bearings 63 mounted on the roller shaft 70 are fitted in the flanges 60, respectively, so that the roller shell 50 turns smoothly around the roller shaft 70. In addition, the bearings 63 are secured to the flanges 60 with fixing rings 64, respectively, so that they may not be displaced in the axial direction.

Gears (not shown) are mounted on the cylindrical parts 62 of the flanges 60, respectively, and fixedly positioned with screws.

Figure 3:
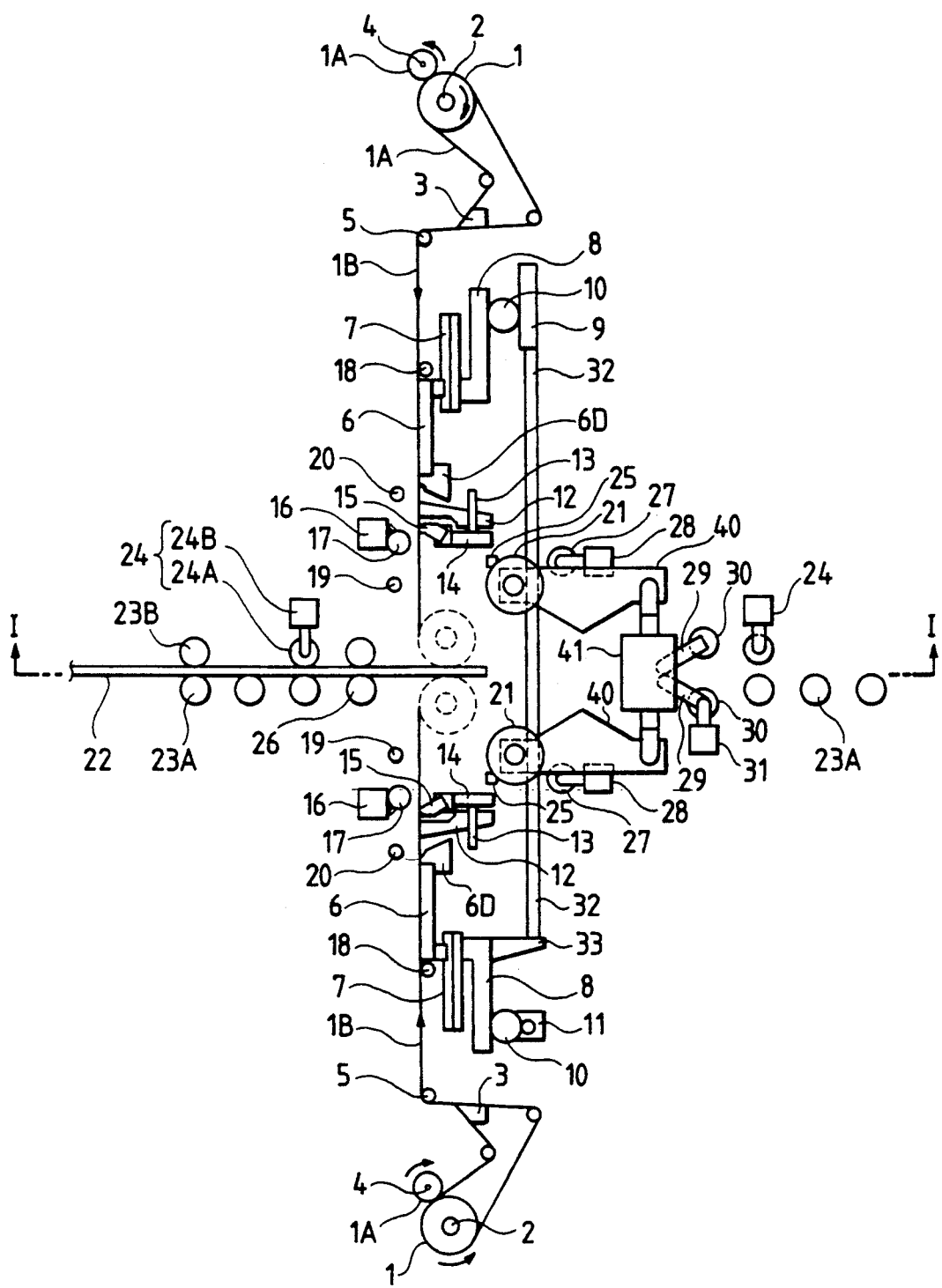
FIG. 3 is a side view showing a laminator with the pressurizing rollers according to the invention.

FIG. 3 is a side view showing the arrangement of the laminator, the embodiment of the invention, or an explanatory diagram showing a film path as viewed from the side of the laminator.

In the laminator of the invention, as shown in FIG. 3, a laminated film 1, which is a three-layer film including a transparent resin film, a photo-sensitive resin layer and a transparent resin film, is wound on a supply roller 1. The laminated film 1 wound on the supply roller 2 is separated with a film separating member 3 into a transparent resin film (protective film) 1A, and a laminated film 1B consisting of a photo-sensitive film whose one side (bonding side) has been exposed and a transparent resin film (hereinafter referred to as merely as "a film 1B", when applicable).

The transparent resin film 1A is wound on a take-up roller 4. The above-described supply roller 2 and take-up roller 4 are provided above a panel (support) conveying path I-I, and the same supply roller 2 and take-up roller 4 are provided below the panel conveying path I-I symmetrically.

The front end portion of the film 1B, as shown in FIG. 3, is moved through a tension roller 5 to a main vacuum plate (or film supplying member) 6 with an end member 6D. A static electricity removing unit (discharging unit) 18 is provided near the main vacuum member 6.

The main vacuum member 6 is so designed that it is moved to and from a film bonding position (moving up and down). More specifically, the main vacuum member 6 is slidably mounted on a guide rail 7 which is mounted on a main vacuum plate supporting board 8 (film supplying member supporting board). The supporting board 8 is vertically movably mounted through a rack gear (not shown) and a pinion gear 10 on a mounting frame which is secured to the machine body (the housing of the film bonding machine).

The pinion gear 10 is engaged with the rack gear 9 provided on an upper and lower main vacuum plate supporting board coupling bar 32 which is coupled to a drive motor 11.

The main vacuum plate supporting board 8 is provided with an end portion winding film holding member 12 which is slidably mounted on a fore and aft guide rail. The film holding member 12 has a coupling cut member, with which a coupling bar 13 is engaged. The coupling member 13 is connected to a stationary edge supporting member 14 having a stationary edge 15.

A rotary edge 17 is supported by a rotary edge supporting member 16 in such a manner that it is rotatable. The rotary edge 17 has a cutting edge inclined at a predetermined angle.

Air blowing pipes 19 and 20 are provided above and below the rotary edge supporting member 16, respectively, to blow air towards the film 1B.

In FIG. 3, reference numeral 21 designates the pressurizing rollers; 22, a printed circuit board forming panel (hereinafter referred to merely as "a panel 22); 23A, a driving roller; 23B, a driven roller; 24, panel retaining members; and 25, vacuum bars. Each panel retaining member 24 comprises a panel retaining roller, and a air cylinder for moving it up and down.

Further in FIG. 3, reference numeral 26 designates wet rollers; 27, lamination roller (pressurizing roller) wiping rollers; 28, air cylinders for operating the lamination roller (pressurizing roller) wiping rollers; 29, panel wiping roller supporting members; 30, panel wiping rollers; 31, an air cylinder for operating the panel wiping rollers; and 33, a coupling bar mounting member.

The films 1B are bonded onto the panel 22 as follows: The films are sent towards the panel 22 advancing between the upper and lower pressurizing rollers 21. More specifically, while being moved in between the film bonding surfaces (separated surfaces) of the films, the panel 22 is pushed with the upper and lower pressurizing rollers 21. That is, the films are bonded onto the panel 22 while the latter passes through the pressurizing rollers 21.

The distance between the outer cylindrical walls of the upper and lower pressurizing rollers 21 is set to about 15 mm.

Pressurizing roller shafts 70 are mounted on upper and lower pressurizing roller mounting members, respectively, which are movable in parallel with the direction of conveyance of the panel and in a direction perpendicular to the direction of conveyance of the panel.

Both end portions of each pressurizing roller shaft 70 are coupled to the pressurizing roller mounting member 40 through roller shaft tightening members with screws. The pressurizing roller mounting members 40 have gears which are engaged with the gears of the flanges 60 so as to be driven by the drive motor.

The pressurizing roller mounting members 40 are provided as follows: Two pairs of pressurizing roller mounting members are on the right and left sides, respectively, being spaced about 950 mm from each other. An air cylinder 41 for operating the upper and lower pressurizing rollers 21 is coupled to the ends of the pressurizing roller mounting members 40 which are opposite to the ends to which the upper and lower pressurizing rollers 21 are coupled.

The air cylinder 41 causes the upper and lower pressurizing roller mounting members 40 to apply a force of about 440 kgf to the roller shafts 70 of the upper and lower pressurizing rollers 21, thereby to push the latter against each other.

While the panel 22 is being conveyed by the conveyor, the front end portions of the separated film are (temporarily) bonded to the front end portions, as viewed in the direction of conveyance, of the upper and lower surfaces of the panel 22 as required.

The upper and lower pressurizing rollers 21 approach the front end portion of the panel 22, and push the upper and lower surfaces of the panel 22 through the films 1B, respectively.

The position where the upper and lower pressurizing rollers 21 push the upper and lower surfaces of the panel is such that the non-bonding surfaces (non-separation surfaces) of films 1B are brought into contact with the cylindrical outer walls of the pressurizing rollers 21 at least at an angle of 90°.

The surface temperatures of the upper and lower pressurizing rollers 21 are maintained at 100° C. with temperature detectors (not shown) held in contact with the surfaces thereof and with a temperature controller which, in response to the output signals of the temperature detectors, controls the voltage applied to the coil 72 according to a phase control system.

The pressurizing rollers 21 convey the panel, while heating the non-bonding surfaces (non-separation surfaces) of the films 1B through their outer cylindrical walls immediately before the latter are bonded onto the panel, and bonding them onto the panel 22.

The surface temperatures of the pressurizing rollers 21 are an essential factor in bonding the films 1B onto the surfaces of the panel 22.

When, depending on the type of film 1B employed, the surface temperature of each of the pressurizing rollers 21 is lower than a predetermined value, then the film 1B will not be sufficiently bonded onto the panel. When, on the other hand, it is higher, then bubbles are formed between the film 1B and the panel 22. Thus, controlling the surface temperatures of the pressurizing rollers 21 is essential.

In general, in the case where an electrical heater is employed as a heating source for the pressurizing roller, the PID control of the phase control type is most suitable for controlling the surface temperature of the pressurizing roller. In the case where, as was described before, the pressurizing roller has the jacket chambers 52 filled with a thermal medium, an on-off control system in which the heater is turned on and off or the aforementioned phase control system may be effectively employed for controlling the surface temperature of the pressurizing roller.

The pressurizing roller of the invention, which is the electromagnetic induction heat generating roller with the jacket chambers 52, is electrically equivalent to a leakage transformer. Therefore, when voltage is applied to the heat source, or the coil 61, then similarly as in the case of a transformer, a rush current several times its rated current will flow.

It has been found through experiments that, in terms of percentage, the occurrence of rush current larger than the rated current is about 45%, and the occurrence of rush current five times the rated current is of the order of 20%.

Figure 4:
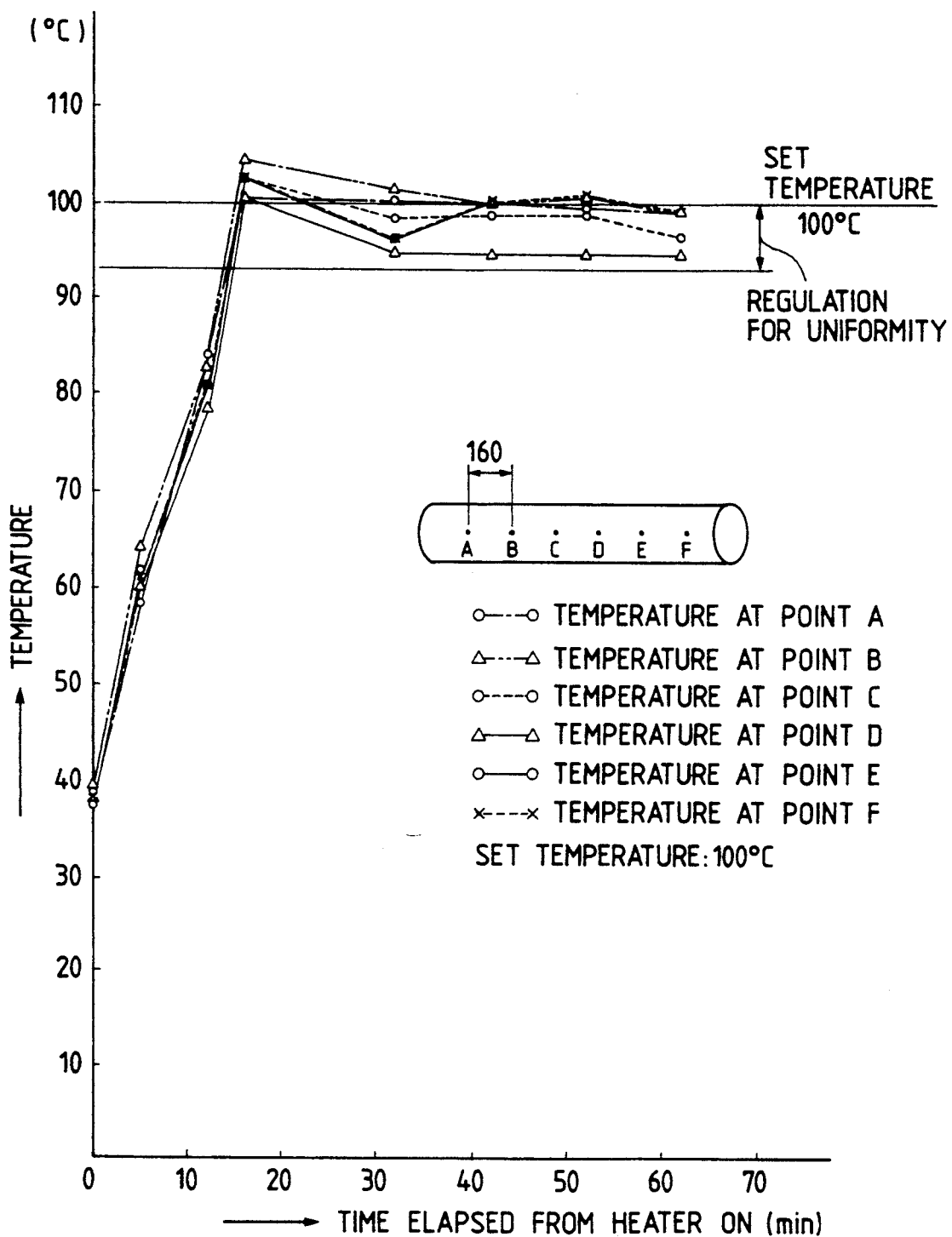
FIG. 4 is a graphical representation indicating the uniformity of the surface temperature of the pressurizing roller which is made up of the electromagnetic induction heat generating roller.
Figure 5:
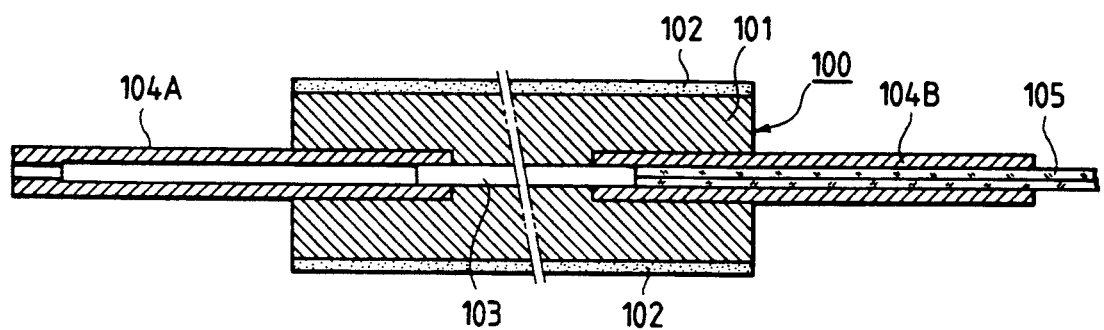
FIG. 5 through FIG. 7 are explanatory diagrams for a description of difficulties accompanying a conventional laminator.
Figure 6:
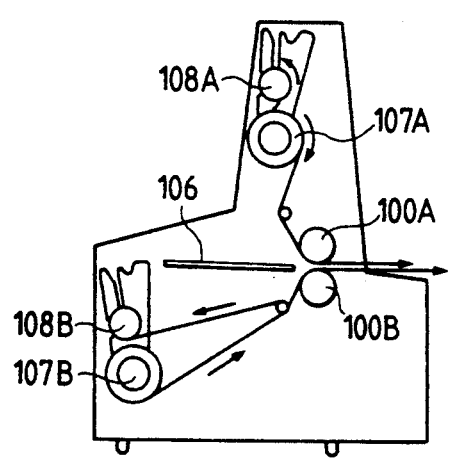
Figure 7:
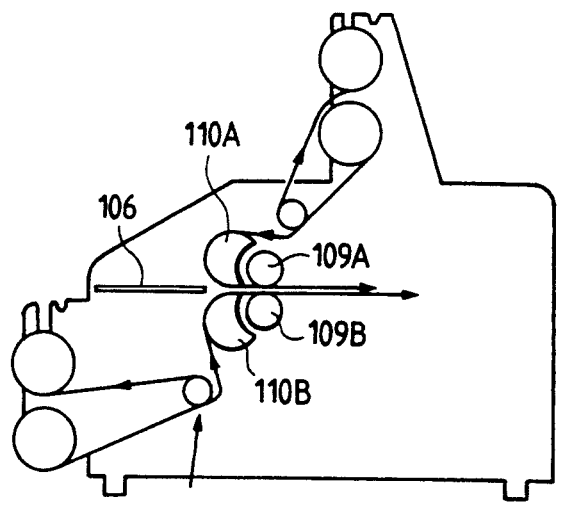

When the temperature of the electromagnetic induction heating generating roller is controlled by a proportional control action, integral control action, or derivative control action (P.I.D.) of an on-off control system, the rush current flowing in the coil cannot be disregarded. Thus, the phase control system is most suitable for elimination of the difficulty that the rush current adversely affects the control element etc. and causes vibration noises. The surface temperature of the pressurizing roller 21, which is the electromagnetic induction heat generating roller, is uniform as shown in FIG. 4.

As is apparent from the above description, in each of the upper and lower pressurizing rollers 21, comprising the hollow roller shell 50 with two flanges 60, and the roller shaft 70 penetrating the hollow roller shell 50, force is applied to both ends of the roller shaft 70. Therefore, the roller shells 50 are pushed against each other uniformly over the entire width.

In other words, the bending moment attributed to the force applied to both ends of each of the roller shafts 70 acts on the roller shaft 70, but it scarcely acts on the roller shell 50. Therefore, with the pressurizing rollers 21 having uniform pressure, the films 1b are bonded to the panel 22.

Each of the pressurizing rollers 21 has the cylindrical outer wall which is the rubber layer 1.5 to 3 mm in thickness. Each of the films 1B is bonded to the panel 22 while its non-bonding surface is being preheated through the outer wall of the pressurizing roller 21; that is, the film 1B is bonded to the panel 22 with the outer wall of the pressurizing roller 21 having uniform distribution of temperature. This can eliminate the difficulty that, because of the unevenness of the surface of the panel 22, it is difficult to uniformly bond the film to the panel.

A phase control heating system is employed to heat the pressurizing roller 21. Therefore, the pressurizing surface of the pressurizing roller 21 can be made uniform in temperature.

While the invention has been described above in connection with a preferred embodiment thereof, it should be noted that the invention is not limited thereto or thereby; that is, it will be obvious to those skilled in the art that various changes and modifications may be made therein without departing from the invention.

As was described above, the films can be bonded to the panel with the pressurizing rollers that are uniform in pressure.

In addition, the pressurizing surfaces of the pressurizing rollers can be maintained uniform in temperature.

Furthermore, the difficulty can be eliminated that, because of the unevenness of the surface of the panel, it is difficult for the film to uniformly bond to the panel.

What is claimed is:

1. A pressurized roller for bonding a film to a panel by application of substantially uniform heat and pressure to the film and panel, comprising:
   a roller outer shell;
   a pair of flanges at opposite ends, respectively, of said roller outer shell;
   a roller shaft, to which an angular moment of force is applied, passing through said flanges and said roller outer shell and extending axially from both ends thereof;
   bearings located between said shaft and an inner diameter of said flanges to transfer said angular moment of force to said flanges and thereby to said roller outer shell;
   a shell heater located within said shell circumscribing said shaft; and
   a rubberized layer covering said roller outer shell.

2. A pressurized roller as claimed in claim 1 wherein said heater comprises a phase control system for controlling the heating of said roller.

3. A pressurized roller as claimed in claim 1 wherein said heater is an electromagnetic induction heater.

4. A pressurized roller as claimed in claim 3 wherein said induction heater comprises an iron core within said outer shell and surrounding said roller shaft and a current carrying coil within said outer shell and surrounding said iron core.

5. A pressurized roller as claimed in any of claims 1–3 wherein said roller outer shell has a plurality of cavities therein filled with a thermal medium.

6. A pressurized roller as claimed in claim 1 wherein each said flange has a flange shaped disc part which abuts a respective outer shell edge and having an outer diameter slightly less than that of said outer shell, and a small diameter cylindrical part contiguous with said disc part and having an outer diameter substantially less than that of said disc part and an inner diameter which abuts said bearings.

7. A pressurized roller as claimed in claim 1, wherein the thickness of said rubberized layer is between 1.5 and 3 mm.

* * * * *